A. P. GIBSON.
Fruit-Box.

No. 206,719. Patented Aug. 6, 1878.

Witnesses
C. L. Parker
Fred. A. O'Kein

Inventor Andrew P. Gibson,
By Attorney George H. Christy.

UNITED STATES PATENT OFFICE.

ANDREW P. GIBSON, OF CHICAGO, ILLINOIS, ASSIGNOR TO LUCIUS G. FISHER, JR., AND FRANCIS T. WHEELER, OF SAME PLACE.

IMPROVEMENT IN FRUIT-BOXES.

Specification forming part of Letters Patent No. 206,719, dated August 6, 1878; application filed May 31, 1878.

*To all whom it may concern:*

Be it known that I, ANDREW P. GIBSON, of Chicago, county of Cook, State of Illinois, have invented or discovered a new and useful Improvement in Fruit-Boxes; and I do hereby declare the following to be a full, clear, concise, and exact description thereof, reference being had to the accompanying drawing, making a part of this specification, in which—like letters indicating like parts—

Figure 1:
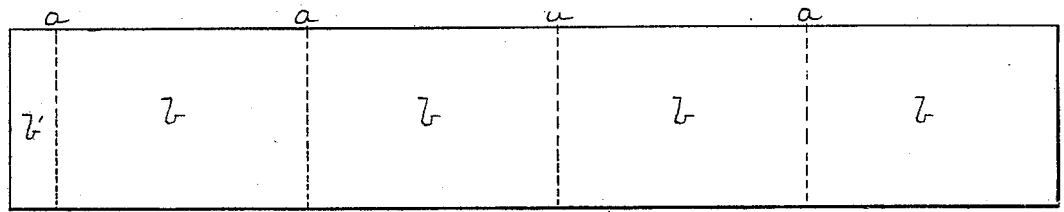
Figure 2:
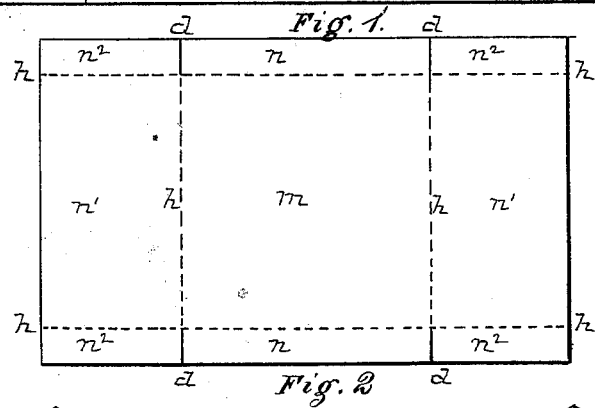
Figure 3:
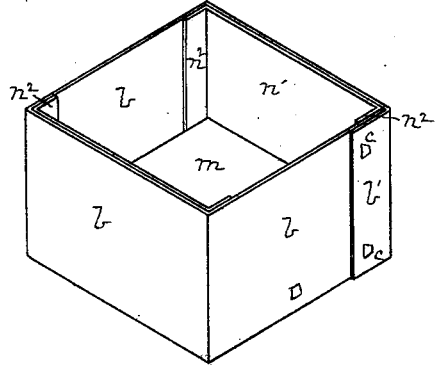
Figure 4:
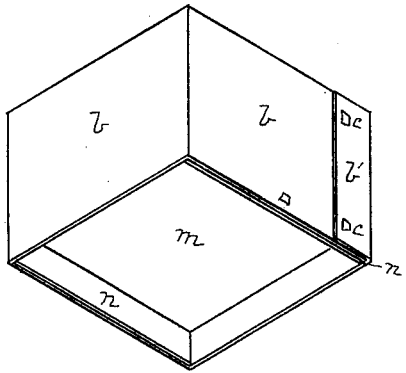

Figure 1 shows in outline a blank from which the sides of my improved box are formed. Fig. 2 is a like view of a blank from which the bottom of the box is formed. Fig. 3 is a perspective view of the box looking upon the top; and Fig. 4 is a like view of the box looking upon the bottom.

My invention relates to the manufacture of berry and other fruit boxes.

Some of the principal features to be secured in boxes intended for storing or shipping small fruits are economy of space in packing, lightness, with considerable strength, cheapness, and a form or construction which will permit the fruit in the several boxes to be rounded or heaped up above the rim or upper edge, and not be crushed or spilled when packed in crates for shipping.

These features I secure by a box of the following construction: A strip of paper-board, or other thin and light material of suitable width for the height of the box desired, and of suitable length for forming the sides, is creased transversely, as shown by dotted lines $a$, Fig. 1. These creases are made at proper intervals to mark the angles of the box, of which the divisions $b$ form the sides, and the end $b'$ forms a lap for convenience in fastening, as seen in Figs. 3 and 4. The fastening may be made in any known or convenient way. I have shown sheet-metal clips $c$, cut triangular, which are passed through slits in the lapping parts and then bent down or clinched. I prefer to so crease and bend the blank that the box shall be of four sides and right angles at the corners.

For the bottom of the box I employ a blank, as shown in Fig. 2. The width of this blank is, by preference, equal to the interior width of the box in one direction plus twice the distance the bottom proper is raised above the lower edge, and the length equal to the width of the box in the other direction plus twice the distance from the bottom proper to the top edge. This blank is slitted or cut from the sides into the points marking the corners of the bottom proper, as shown by full lines at $d$, and it is also creased, as shown by dotted or broken lines $h$, along the lines marking the angles of the box.

This slitting and creasing the blank mark it into parts or divisions $m\ n\ n^1\ n^2$. The part $m$ forms the bottom proper of the box. The parts or edges $n$ are bent down to form or strengthen flanges on the box below the bottom. The end parts $n^1$ are bent up to form or strengthen two opposite sides of the box, and the corner parts $n^2$ are bent in to lap onto the other two sides of the box and strengthen the vertical angles. When thus bent this blank is put in place within the sides $b$, as seen in Figs. 3 and 4, and the several parts of the two blanks are fastened together by a suitable number of clips, $c$, or in other convenient way.

A fruit-box is thus secured having a flange projecting below the bottom, which extends, by preference, entirely around the box, thus inclosing, when packed in crates, and covering the heaped-up fruit of the box below and preventing the same from being displaced or crushed.

By means of the downwardly-bent edges $n$ the flange below the bottom $m$ is made of double thickness on two opposite sides, and by means of the upwardly-bent ends $n^1$ the other two opposite sides of the box proper are also doubled, and the remaining two sides doubled in part and the vertical angles braced and strengthened by the corner-pieces $n^2$; and not only is the bottom of the box firmly supported in this way, and the parts of the box greatly strengthened, but a better bearing surface is also obtained for the lower edge of one box to rest upon the upper edge of another.

The advantage of having the flange which projects below the bottom $m$ extend entirely around the box is obvious, as thereby the fruit in the box below may not only be heaped up somewhat, but when packed in crates the fruit in each box will be entirely inclosed and its safe transit much better insured.

The bottom $m$ may be placed any desired distance above the lower edge, thus making a shallow or deep flange, as desired.

I do not consider it essential to my invention that the pieces $n$ should extend to the lower edge, or the pieces $n^1$ $n^2$ to the upper edge, of the box, though, for the reasons before given I prefer that they do so. The corner-pieces $n^2$ may also be cut out entirely; but, as the box will to this extent be weakened and injured, I prefer to retain them as described.

I claim as my invention—

1. A fruit-box bottom made in one piece, creased, cut, and bent, substantially as indicated in Fig. 2, so as to give downwardly-projecting flanges $n$ as a means of support and upwardly-projecting ends $n^1$ (with or without corner-pieces $n^2$) for connecting with and bracing the body or sides of the box.

2. A fruit-box having the sides made in one piece and a downwardly and upwardly flanged bottom made in another piece, substantially as described.

In testimony whereof I have hereunto set my hand.

ANDREW P. GIBSON.

Witnesses:
JAMES WILSON,
HENRY ANGER.